United States Patent [19]

Kuroki et al.

[11] Patent Number: 4,482,612
[45] Date of Patent: Nov. 13, 1984

[54] LOW ALLOY OR CARBON STEEL ROLL WITH A BUILT-UP WELD LAYER OF AN IRON ALLOY CONTAINING CARBON, CHROMIUM, MOLYBDENUM AND COBALT

[75] Inventors: Hironori Kuroki; Tsuguo Honda, both of Fukuoka, Japan

[73] Assignee: Kuroki Kogyosho Co., Ltd., Fukuoka, Japan

[21] Appl. No.: 408,386

[22] Filed: Aug. 13, 1982

[51] Int. Cl.$^3$ ............................................. B32B 15/18
[52] U.S. Cl. ...................................... 428/683; 29/115; 428/684; 428/685; 75/126 C; 75/126 H; 75/126 R
[58] Field of Search .................. 428/683, 684, 685; 29/115; 75/126 R, 126 C, 126 H

[56] References Cited

U.S. PATENT DOCUMENTS 3,855,015 12/1974 Nemoto et al. .................. 428/683
4,110,514 8/1978 Nicholson ........................ 428/683

*Primary Examiner*—Veronica O'Keefe
*Attorney, Agent, or Firm*—Jordan and Hamburg

[57] ABSTRACT

A roll of which surface cracks are hardly caused under the condition of repetitive heating and cooling. A roll comprises that the alloy consisting of no more than 0.10 percent by weight of carbon, 10~14 percent by weight of chromium, 0.1~1.0 percent by weight of molybdenum, 0.5~2.0 percent by weight of cobalt and essentially balanced iron is coated on the surface of a roll body consisting of low alloy or carbon steel by build-up welding.

Therefore, build-up welding layer of the above-mentioned compositions excel in view of resistance to corrosion, and that fact is related with a long-life of a roll.

5 Claims, 18 Drawing Figures

LOW ALLOY OR CARBON STEEL ROLL WITH A BUILT-UP WELD LAYER OF AN IRON ALLOY CONTAINING CARBON, CHROMIUM, MOLYBDENUM AND COBALT

A roll having a built-up weld layer thereon.

BACKGROUND OF THE INVENTION

The present invention relates to a high order of durable roll. In the cases of a roll which is used at hightemperature ranges such as a hot rolling process or a continuous casting process, its strength, toughness and resistance to corrosion at high temperature ranges are required for the roll. As the material of a roll or the material which is formed as a built-up weld layer on the surface of a roll used at high temperature ranges, an alloy steel containing 10~14 percent by weight of chromium is generally used. However, the aforesaid alloy steel containing 10~14 percent by weight of chromium does not have enough resistance to repetitive thermal stress, and there are defects which appear when the surface of a roll such as a continuous casting roll sustains continuously repetitive heating and cooling treatment such as cracks which lead to the breakdown of the roll as a consequence of the thermal stress.

SUMMARY OF THE INVENTION

It is an object of the present invention to provide a high order of durable roll. Another object of the invention is to provide a high order of durable roll especially at high temperature ranges. These objects of the present invention are achieved with an alloy having excellent toughness, resistance to heat, to corrosion, and to repetitive thermal stress. The aforementioned alloy consisting of no more than 0.10 percent by weight of carbon, 10~14 percent by weight of chromium, 0.1~1.0 percent by weight of molybdenum, 0.5~2.0 percent by weight of cobalt and the balance essentially iron, is deposited on the surface of a steel roll body by build-up welding.

DETAILED DESCRIPTION OF THE PREFERRED EMBODIMENTS

Figure 1:
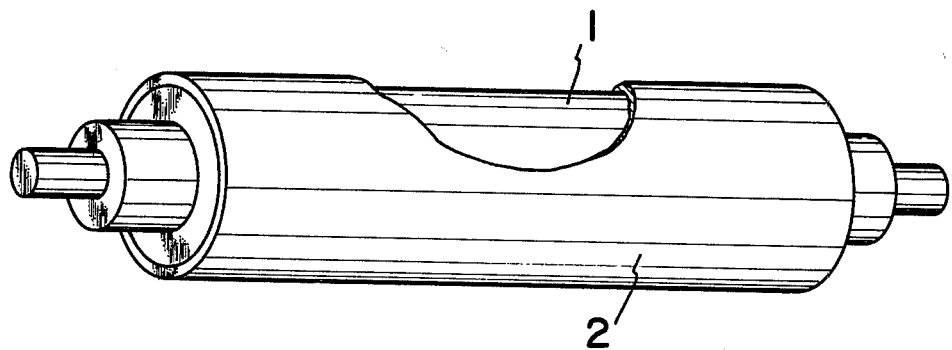
FIG. 1 is a perspective view in accordance with the present invention partially broken away.

The roll of the present invention is comprised of a roll body (1) and a built-up weld layer (2) which is welded on the surface of the roll body as shown in FIG. 1. The roll body (1) consists of a low alloy carbon steel and the built-up weld layer (2) consists of an alloy having a composition of no more than 0.10 percent by weight of carbon, 10~14 percent by weight of chromium, 0.1~1.0 percent by weight of molybdenum, 0.5~2.0 percent by weight of cobalt and the balance essentially iron. The experiments for achieving the present invention and their results are shown in the following.

Test Pieces

Figure 2:
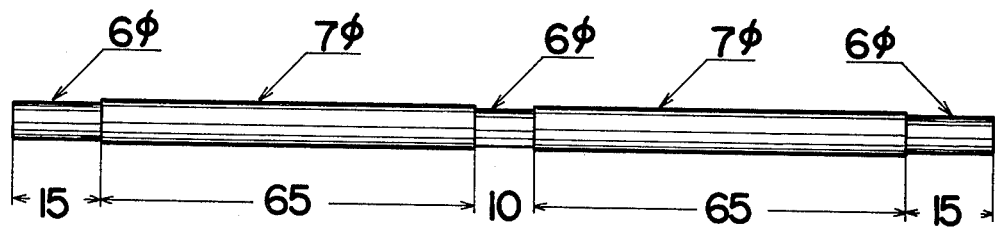
FIG. 2 is a front view, presenting the shape and size of a test piece for the high-temperature tension test.
Figure 3:
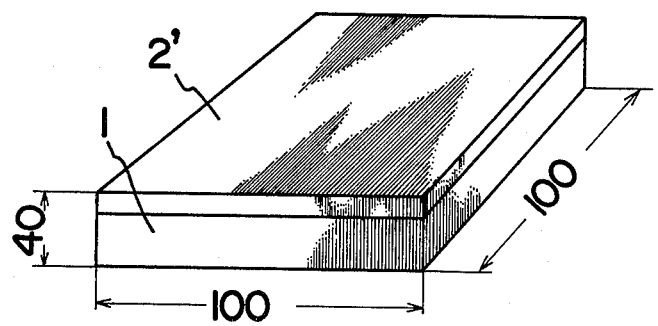
FIG. 3 is a perspective view, presenting the shape and size of a test piece for the repetitive thermal impact test.

Firstly, a built-up weld layer having various component compositions as shown in Table 1, is formed on a steel plate substrate (JIS G3101 SS41) by the multi-layer welding method, and then test pieces after the post weld heat treatment at 625° C. for 2 hours, are prepared for the tension test, the impact test, the hardness test, the high-temperature tension test and the repetitive thermal impact test. Therefore, as regards the shape and size of the above-mentioned test pieces, JIS Z2202, No. 14 test piece (6 mm in diameter) was used for the tension test, and JIS Z2202, No. 4 test piece (5 mm in width) for the impact test. Also, a test piece of the shape and size of FIG. 2 was used for the hightemperature tension test. A test piece as shown in FIG. 3 was used for the repetitive thermal impact test; the built-up layer (2') of 10 mm thickness was coated on a steel plate substrate of SS41 (1').

Repetitive Thermal Impact Test

Figure 4:
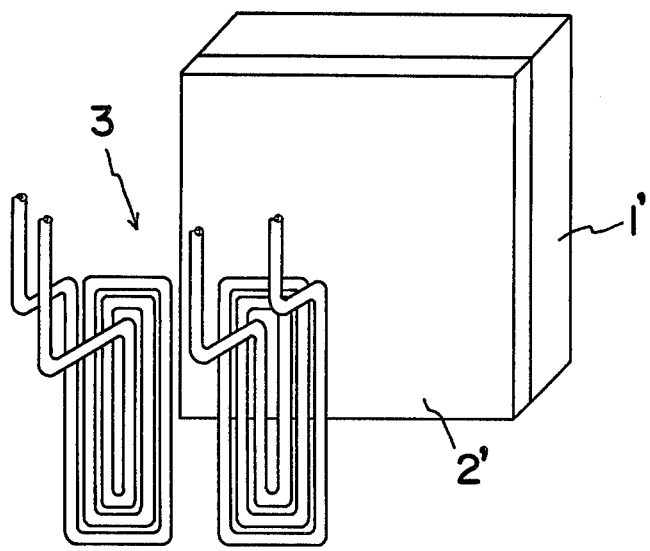
FIG. 4 and FIG. 5 show the method of the repetitive thermal impact test.
Figure 5:
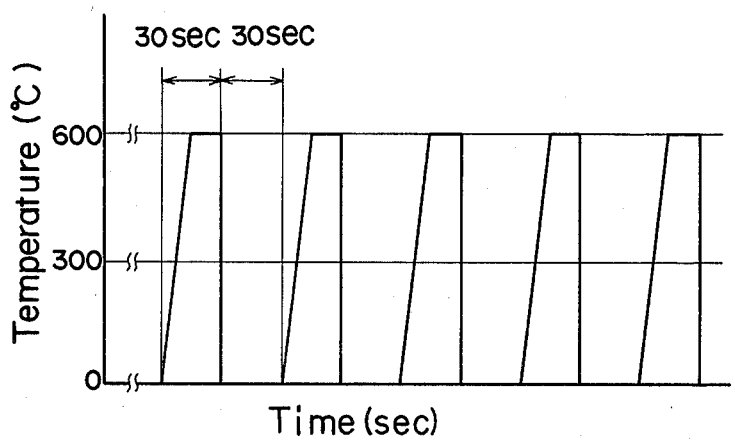
Figure 6:
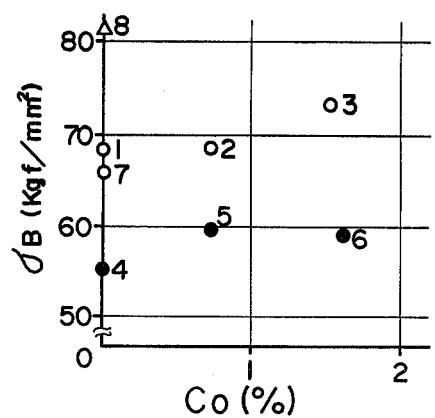
FIG. 6 to FIG. 10 show graphs, presenting the changes of various mechanical properties which accompany the changes of Cr and Co quantities.
Figure 7:
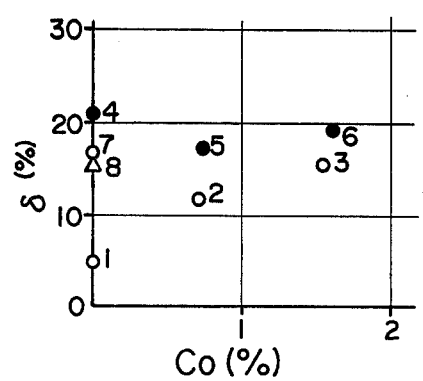
Figure 8:
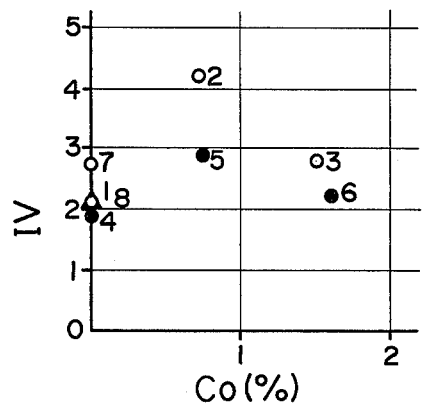
Figure 9:
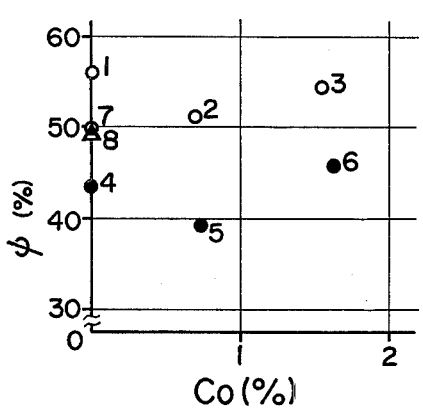
Figure 10:
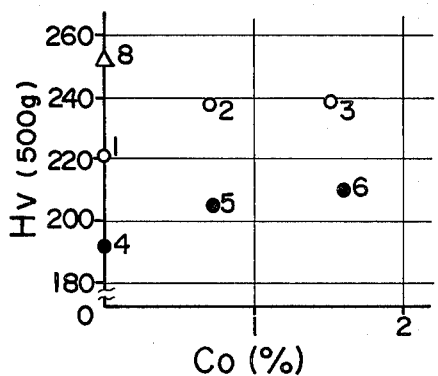
Figure 11:
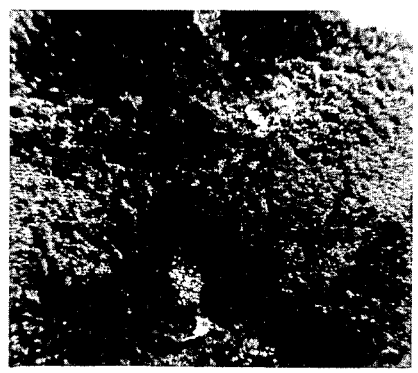
FIG. 11 to FIG. 18 show photomicrostructures of the surface condition of test pieces No. 1 to No. 8 after the repetitive impact test.
Figure 12:
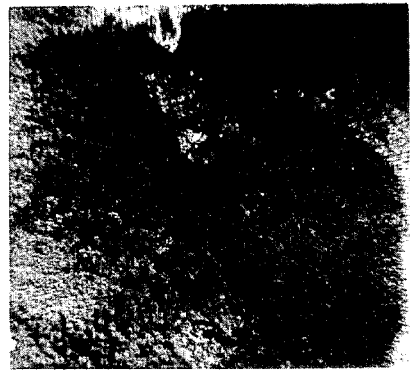
Figure 13:
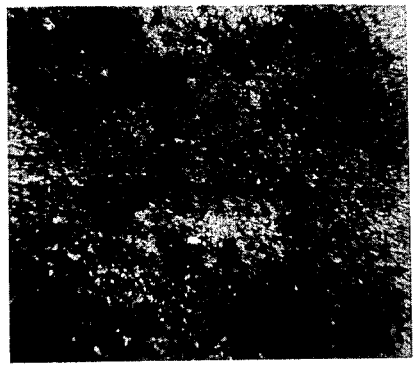
Figure 14:
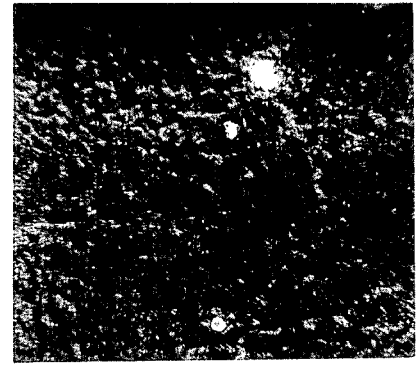
Figure 15:
Figure 16:
Figure 17:

As to the repetitive thermal impact test for testing resistance to cracks, one set of two induction coils was placed slightly separated from the surface of a test piece as shown in FIG. 4. Then the test piece was subjected to repeated cycles of heating and cooling 1,000 times as shown in FIG. 5, and after that, the surface condition of the test piece was observed.

TABLE 1

| No. | C | Si | Mn | P | S | Ni | Cr | Mo | Co |
|---|---|---|---|---|---|---|---|---|---|
| 1 | 0.06 | 0.70 | 1.55 | 0.011 | 0.009 | 0.02 | 10.59 | 0.03 | — |
| 2 | 0.06 | 0.63 | 0.73 | 0.018 | 0.010 | 0.02 | 10.22 | 0.67 | 0.74 |
| 3 | 0.07 | 0.67 | 0.71 | 0.021 | 0.012 | 0.02 | 10.37 | 0.76 | 1.56 |
| 4 | 0.05 | 0.69 | 1.83 | 0.012 | 0.009 | 0.03 | 12.54 | 0.02 | 0.01 |
| 5 | 0.05 | 0.59 | 0.71 | 0.017 | 0.012 | 0.03 | 13.01 | 0.59 | 0.75 |
| 6 | 0.05 | 0.62 | 0.73 | 0.020 | 0.014 | 0.06 | 12.32 | 0.61 | 1.63 |
| 7 | 0.08 | 0.61 | 0.71 | 0.020 | 0.013 | 0.02 | 10.77 | 0.04 | 0.014 |
| 8 | 0.08 | 0.69 | 0.45 | — | — | 0.16 | 9.01 | — | — |

(% by weight)

The Results Of Each Test

The mechanical properties of each test piece are shown in the following Table 2.

TABLE 2

| | room temperature | | | | | high temperature σB | | | | high temperature φ | | | |
|---|---|---|---|---|---|---|---|---|---|---|---|---|---|
| No. | σB | δ | φ | Hv | IV | 500° C. | 600° C. | 700° C. | 800° C. | 500° C. | 600° C. | 700° C. | 800° C. |
| 1 | 68.2 | 5.0 | 55.7 | 221 | 2.1 | 45.1 | 36.6 | 23.6 | | 51.5 | 59.9 | 81.2 | |
| 2 | 68.4 | 11.8 | 51.0 | 238 | 4.2 | 46.9 | 39.7 | 25.9 | 15.9 | 44.7 | 50.4 | 69.0 | 84.7 |
| 3 | 73.0 | 15.3 | 54.4 | 239 | 2.8 | 50.5 | 42.5 | 28.0 | 16.1 | 51.9 | 58.3 | 72.8 | 74.6 |
| 4 | 55.3 | 21.0 | 43.2 | 192 | 1.9 | 35.7 | 28.9 | 17.6 | 11.0 | 44.8 | 50.8 | 75.5 | 83.7 |
| 5 | 59.7 | 17.5 | 38.8 | 206 | 2.9 | 41.3 | 33.7 | 22.5 | 14.1 | 41.0 | 48.7 | 68.0 | 81.9 |
| 6 | 59.3 | 19.3 | 45.4 | 210 | 2.2 | 40.5 | 33.5 | 22.3 | 13.2 | 40.4 | 44.8 | 64.0 | 79.0 |
| 7 | 66.0 | 16.7 | 49.8 | | 2.7 | 44.0 | 36.2 | 24.0 | 13.7 | 45.7 | 49.9 | 75.0 | 78.8 |

TABLE 2-continued

| No. | room temperature | | | | | high temperature σB | | | | high temperature φ | | | |
|---|---|---|---|---|---|---|---|---|---|---|---|---|---|
| | σB | δ | φ | Hv | IV | 500° C. | 600° C. | 700° C. | 800° C. | 500° C. | 600° C. | 700° C. | 800° C. |
| 8 | 81.2 | 15.4 | 49.0 | 252 | 2.1 | 50.1 | 41.7 | 26.8 | | 43.1 | 45.1 | 64.2 | |

In the above identified Table 2, σB presents the tensile strength (Kgf/mm²), δ presents the elongation (%), ψ presents the reduction of area (%), Hv presents Vickers hardness, and IV presents Charpy impact value (Kfgm/cm²), (hereinafter referred to in the same manner).

The results of the above-mentioned Table 2, diagrammatically shown in FIG. 6 to FIG. 10, clearly show the effects of the addition of Cr and Co in particular at room temperature. Referring now to FIG. 6 to FIG. 10, "O" indicates the case of 10 percent by weight of Cr, "●" indicates the case of more than 12 percent by weight of chromium, "Δ" indicates the case of 9 percent by weight of chromium and small sized numbers in the above identified Figures indicate the numbers of the test pieces which are shown in Table 1.

Figure 18:

Secondly, photomicrostructures of the surface of test pieces (No. 1∼No. 8) after the repetitive thermal impact test are shown in FIG. 11 to FIG. 18. In the case of the 9 percent by weight of chromium test piece, as shown in FIG. 18, surface cracks and corroded grooves along the boundary of weld beads were caused on the test piece by the repetitive thermal impact test. Therefore, at least 10 percent by weight of chromium is necessary for resistance to thermal impact cracks and to corrosion. However, with large quantities of chromium, the strength and the toughness seen to become law as indicated in FIG. 6 to FIG. 10. Also, the effects on the improvement of the mechanical properties by adding cobalt are not observed. Hereby it is proved that no more than 14 percent by weight of chromium is a desirable chromium quantity.

Next, cobalt is used for the improvement of the mechanical properties, especially resistance to the occurrence of surface cracks by repetitive heating and cooling, and resistance to roughness on the surface as shown in Table 2 and FIG. 11 to FIG. 18. That is to say, the roughness on the surface of a roll is observed to be pronounced in test pieces (FIG. 11, 14, 17 and 18) which essentially do not contain cobalt, and in particular in a test piece (FIG. 18) which contains a small quantity of chromium, cracks were caused along weld beads. On the other hand, the occurrence of surface cracks is not observed in the materials containing cobalt which were used for the built-up layer of the present invention (FIGS. 12, 13, 15 and 16), and also it is proved that roughness on the surface is hardly observed. However, as regards more than 2.0 percent by weight for the addition of cobalt, it can hardly be expected that the effects of adding a cobalt quantity as clarified in Table 2 and FIG. 6 to FIG. 10, so that 0.5∼2.0 percent by weight of cobalt is a sufficient cobalt quantity. Also 0.1∼1.0 percent by weight of molybdenum is included for the purpose of improving resistance to temper brittleness. Carbon is the component for improving the strength of steel, but in the case of more than 0.10 percent by weight of carbon, its toughness becomes low and weldability is impaired. Therefore, the quantity of carbon is limited to 0.1 percent by weight as the maximum.

WHAT WE CLAIM IS:

1. A roll having a built-up weld layer thereon comprising a roll body and a built-up weld layer on the surface of said roll body, said roll body consisting essentially of low alloy carbon steel, said built-up weld layer consisting essentially of no more than 0.10 percent by weight of carbon, 10∼14 percent by weight of chromium, 0.1∼1.0 percent by weight of molybdenum, 0.5∼2.0 percent by weight of cobalt and the balance iron.

2. A roll having improved resistance to repetitive thermal stress, said roll having a built-up weld layer thereon comprising a roll body and a built-up weld layer on the surface of said roll body, said roll body consisting essentially of low alloy carbon steel, said built-up weld layer comprising no more than 0.10 percent by weight of carbon, 10∼14 percent by weight of chromium, 0.1∼1.0 percent by weight of molybdenum, 0.5∼2.0 percent by weight of cobalt, and iron.

3. A roll having a built-up weld layer thereon comprising a roll body and a built-up weld layer on the surface of said roll body, said roll body consisting essentially of low alloy carbon steel, said built-up weld layer consisting essentially of no more than 0.10 percent by weight of carbon, 10∼14 percent by weight of chromium, 0.1∼1.0 percent by weight of molybdenum, 0.5∼2.0 percent by weight of cobalt, minor amounts of silicon and manganese, traces of phorphorus and sulfur and the balance iron, said roll having resistance to repetitive thermal stress.

4. A roll according to claim 3, wherein the percent weight of said silicon is about 0.59∼0.70.

5. A roll according to claim 3, wherein the percent weight of said manganese is about 0.45∼1.83.

* * * * *